(12) United States Patent
Glüer et al.

(10) Patent No.: US 9,999,842 B2
(45) Date of Patent: Jun. 19, 2018

(54) HYBRID CONTACT TRAY FOR A MASS TRANSFER COLUMN

(71) Applicant: Sulzer Chemtech AG, Winterthur (CH)

(72) Inventors: Sven Glüer, Zürich (CH); Mark William Pilling, Jenks, OK (US)

(73) Assignee: Sulzer Chemtech AG, Winterthur (CH)

(*) Notice: Subject to any disclaimer, the term of this patent is extended or adjusted under 35 U.S.C. 154(b) by 264 days.

(21) Appl. No.: 14/760,075

(22) PCT Filed: Jan. 16, 2014

(86) PCT No.: PCT/EP2014/050792
§ 371 (c)(1),
(2) Date: Jul. 9, 2015

(87) PCT Pub. No.: WO2014/111461
PCT Pub. Date: Jul. 24, 2014

(65) Prior Publication Data
US 2015/0352464 A1   Dec. 10, 2015

Related U.S. Application Data

(60) Provisional application No. 61/753,171, filed on Jan. 16, 2013.

(51) Int. Cl.
*B01F 3/04* (2006.01)
*B01D 3/32* (2006.01)
(Continued)

(52) U.S. Cl.
CPC .............. *B01D 3/324* (2013.01); *B01D 3/10* (2013.01); *B01D 3/16* (2013.01); *B01D 3/20* (2013.01);
(Continued)

(58) Field of Classification Search
CPC ... B01D 3/10; B01D 3/16; B01D 3/20; B01D 3/205; B01D 3/324; B01F 3/04496; B01F 3/04829
(Continued)

(56) References Cited

U.S. PATENT DOCUMENTS 2,832,578 A    4/1958  Gilmore
3,584,844 A *  6/1971  Papp .................. B01D 3/163
                                              261/114.2
(Continued)

FOREIGN PATENT DOCUMENTS

WO   WO 99/03554   *  1/1999

*Primary Examiner* — Charles Bushey
(74) *Attorney, Agent, or Firm* — Larson & Anderson, LLC (57) ABSTRACT

A hybrid Contact tray for a mass transfer column is provided. The tray has a deck for passage of liquid along a liquid flow path thereon. The deck also has a plurality of orifices for passage of ascending vapor through the tray deck. The contact tray includes a cross-current vapor-liquid mixing section having a first portion of the plurality of orifices and a co-current vapor-liquid mixing section having at least one co-current mixing device associated with a second portion of the plurality of orifices. The co-current mixing device includes a conduit having: a vapor inlet in fluid communication with one or more of the second portion of orifices; a froth inlet in fluid communication with the liquid flow path; a fluid outlet; and a packing material within a co-current flow path of vapor and liquid within the conduit disposed after the vapor and froth inlets and before the fluid outlet.

15 Claims, 5 Drawing Sheets

(51) Int. Cl.
   *B01D 3/16* (2006.01)
   *B01D 3/10* (2006.01)
   *B01D 3/20* (2006.01)

(52) U.S. Cl.
   CPC ...... *B01F 3/04496* (2013.01); *B01F 3/04829* (2013.01)

(58) Field of Classification Search
   USPC .......... 261/114.1, 114.2, 114.3, 114.4, 114.5
   See application file for complete search history.

(56) References Cited

U.S. PATENT DOCUMENTS

| | | | |
|---|---|---|---|
| 3,972,966 A * | 8/1976 | Lund | G01N 25/145 137/138 |
| 4,578,153 A * | 3/1986 | Newton | B01D 3/18 202/158 |
| 4,750,975 A | 6/1988 | Parker et al. | |
| 5,120,474 A | 6/1992 | Binkley et al. | |
| 5,453,222 A | 9/1995 | Lee et al. | |
| 5,641,338 A * | 6/1997 | Brookman | B01D 47/021 261/114.1 |
| 6,059,934 A | 5/2000 | Stober et al. | |
| 6,105,941 A * | 8/2000 | Buchanan | B01D 3/20 202/158 |
| 6,250,611 B1 | 6/2001 | Pilling et al. | |
| 6,585,238 B1 * | 7/2003 | Erickson | B01D 3/20 261/114.1 |
| 6,682,633 B1 | 1/2004 | Xu et al. | |
| 6,799,752 B2 * | 10/2004 | Wu | B01D 3/163 261/114.2 |
| 7,270,316 B2 * | 9/2007 | Burch | B01D 3/20 202/158 |
| 7,540,476 B2 | 6/2009 | Pilling et al. | |
| 7,708,258 B2 | 5/2010 | Pilling et al. | |
| 8,066,264 B2 | 11/2011 | Griepsma et al. | |
| 8,720,870 B2 | 5/2014 | Pilling et al. | |
| 2004/0099970 A1 * | 5/2004 | Zich | B01D 3/12 261/114.5 |
| 2009/0134533 A1 | 5/2009 | Griepsma et al. | |
| 2009/0256270 A1 | 10/2009 | Griepsma | |
| 2012/0055337 A1 | 3/2012 | Chommeloux et al. | |

\* cited by examiner

HYBRID CONTACT TRAY FOR A MASS TRANSFER COLUMN

CROSS-REFERENCE TO RELATED APPLICATIONS

The present application is related to concurrently filed U.S. Provisional Patent Application Ser. No. 61/753,171, entitled HYBRID CONTACT TRAY FOR A MASS TRANSFER COLUMN, which is incorporated herein by reference for all purposes.

BACKGROUND

Mass transfer columns, such as distillation, absorption, and stripping columns, have been provided with various types of contact trays for vapor-liquid contact purposes. These columns are well known in the art for separation of a multi-component feed stream(s) and are not particularly limited herein. Examples of such columns and trays are described in U.S. Pat. Nos. 4,750,975; 5,120,474; 5,453,222; and 8,066,264, which are incorporated herein by reference.

Typically, a mass transfer column has a plurality of contact trays horizontally disposed in a spaced apart configuration over the height of the column. A typical contact tray has a deck over which a flow of liquid passes from an inlet downcomer section to an outlet downcomer. The typical tray deck has orifices through which an ascending vapor may flow and over which the liquid may flow in order to bubble or otherwise force the vapor through the liquid in cross-current flow.

A tray is designed to contact liquid and vapor and then allow their separation. In its simplest conceptual form, vapor flows up through holes in the tray deck and contacts liquid. The two disengage and liquid flows downward through the downcomer to the tray below and vapor flows up to the tray above. Since the vapor-liquid contact is intimate, there are mixtures of vapor and liquid almost everywhere on the tray. When operating under certain conditions, such elevated pressure, mixing of liquid and vapor can result in the presence of froth (e.g. a mixture vapor and liquid) on the tray deck(s). Froth can buildup and flow into the downcomer carrying entrained vapor down through the downcomer and/or can flow upward through the holes of the tray above carrying entrained liquid. The efficiency and capacity of the tray and hence the column can be reduced by the occurrence of either event.

Design of distillation columns and their associated internals is a balance of overall material throughput and tray/column efficiency. Accordingly, it is an object of the invention to improve the capacity and efficiency of a tray for a mass exchange column.

SUMMARY OF THE INVENTION

In a first aspect, the present invention provides a hybrid contact tray for a mass transfer column. The contact tray comprising:
a tray deck for passage of liquid along a liquid flow path thereon, the tray deck having a plurality of orifices for passage of ascending vapor through the tray deck;
a cross-current vapor-liquid mixing section having a first portion of the plurality of orifices; and
a co-current vapor-liquid mixing section comprising at least one co-current mixing device associated with a second portion of the plurality of orifices. The co-current mixing device comprises a conduit having: a vapor inlet in fluid communication with one or more of the second portion of orifices; a froth inlet in fluid communication with the liquid flow path; a fluid outlet; and a packing material disposed within a co-current flow path of vapor and liquid within the conduit disposed after the vapor and froth inlets and before the fluid outlet.

In a second and third aspect, the present invention provides a mass transfer column comprising the hybrid tray described above and a method of separating at least one feed stream using the column.

DETAILED DESCRIPTION OF THE INVENTION

The present application is based upon the Inventors' discovery that mass transfer column operating capacity can be increased while maintaining or enhancing efficiency using one or more hybrid contact trays of the present invention in the column. The hybrid contact tray has a cross-current mixing section and a co-current mixing section disposed within a liquid flow path of the tray deck. Without being bound by a particular mechanism of operation, the present Inventors believe that use of a hybrid configuration of cross-current and co-current mixing sections allows vigorous mixing and intimate contact of liquid and vapor on the tray while reducing froth buildup which results from vigorous mixing. Furthermore, use of the present hybrid trays, and in particular the co-current mixing sections and devices, allow for increased vapor flows through the tray and column without increasing operational costs or reducing efficiencies.

Figure 1:
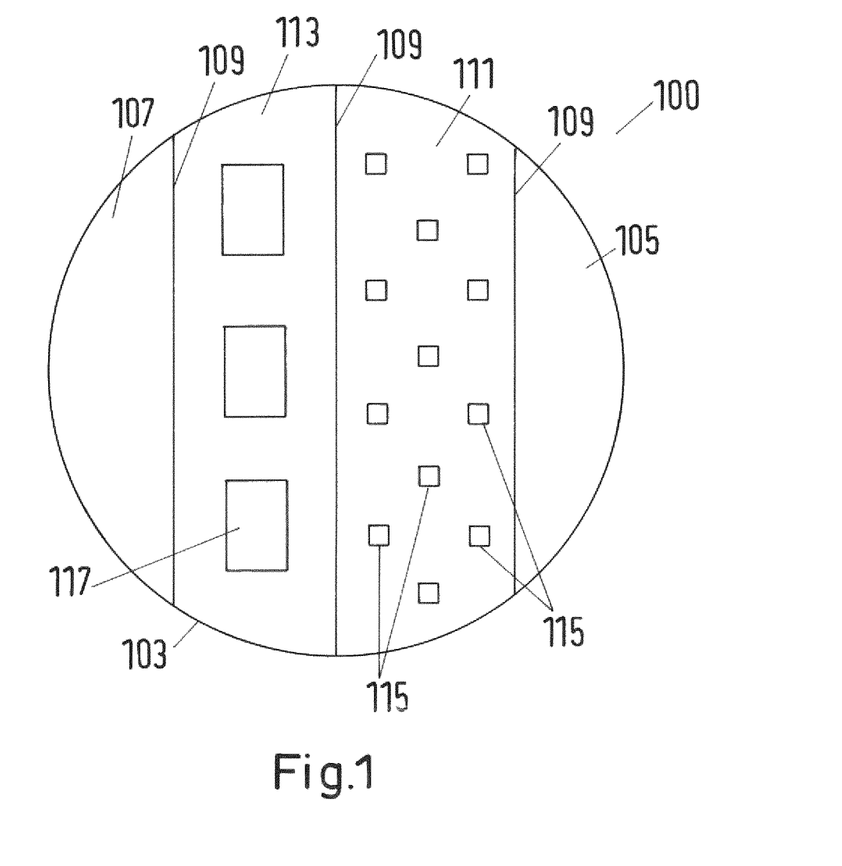
FIG. 1 is a top elevation view of a hybrid tray in accordance with the present invention.

In a first aspect the present invention provides a hybrid contact tray for a mass transfer column. Referring to the embodiments depicted in FIG. 1, the contact tray 100 has a tray deck 103 for passage of liquid along at least one liquid flow path thereon. The liquid flow path is from an inlet downcomer section 105 to an outlet downcomer section 107. The outlet downcomer section 107, as shown in FIG. 1, is typically a region of the tray where liquid spills over an outlet weir 109 (shown in FIG. 1 between co-current mixing section 113 and downcomer section 107) to the tray below. The tray deck 103 further has a plurality of orifices, which are shown in FIG. 1 to be associated with mixing devices (115, 117), for passage of ascending vapor through the tray deck 101.

The tray 100 is herein described as a "hybrid" contact tray in that the tray deck 103 has both a cross-current mixing section 111 and a co-current mixing section 113 disposed within a liquid flow path along the tray deck 103. In embodiments where the tray deck has an additional liquid flow path(s), at least one liquid flow path, and more preferably all liquid flow paths, contains both a cross-current mixing section and a co-current mixing section. The terms "co-current" and "cross-current" as used herein with respect to vapor-liquid mixing sections of the tray deck, and with respect to the mixing devices disposed within these sections, describe the flow direction of liquid and vapor in relation to one another in or on the respective devices within the respective sections.

In the cross-current mixing section 111, liquid traveling in the liquid flow path passes over a first portion of the plurality of orifices in the tray deck. Cross-current mixing devices may or may not be associated with the first portion of the plurality of orifices in the cross-current vapor-liquid mixing section 111. Where no mixing devices are associated with the orifices, the orifices themselves provide the vapor-liquid interface in the section as liquid passes directly over the orifice during operation. In some preferred embodiments, for example as shown in FIG. 1, the cross-current vapor-liquid mixing section 111 includes cross-current mixing devices 115 associated with a first portion of the plurality of orifices in the tray deck 103. The term "associated" as used herein means that the mixing device is disposed within the flow path of vapor through the orifice and within the liquid flow path along the tray deck 103 so as to disperse or contact vapor from the orifice in or with liquid. The mixing device 115 is preferably selected so as to minimize liquid that is traveling along the tray deck 103 from entering the orifice and falling to the tray below.

During operation of the tray shown in FIG. 1, vapor passes through the orifice associated with the mixing device 115 and then through the liquid in a direction different than (e.g. across, perpendicular to, or substantially perpendicular to) the liquid flow path. For example ascending vapor from the tray below passes through the orifice, interacts with the mixing device 115, and then bubbles through the liquid passing over the mixing device 115 and orifice. It is noted that the initial entry of vapor into the liquid may be in the direction of the flow path along the tray deck. However, after the initial vapor-liquid contact vapor travels in an upward direction from the tray deck which different than (e.g. across, perpendicular to, or substantially perpendicular to) the direction of the liquid path along the tray deck.

Cross-current mixing devices 115 are well known in the art and are not particularly limited herein. For example, cross-current mixing devices disposed within the cross-current mixing section can be static or fixed with respect to the tray deck. Static or fixed mixing devices include orifice caps covering at least a portion of the orifice which can be formed during formation of the orifice (e.g. by punching and/or bending) and/or inserted after the orifice has been formed. In other embodiments, cross-current mixing devices 115 can include dynamic or floating devices such as orifice caps which move (e.g. open and close) with respect to the tray deck and orifice depending on vapor flow rates and liquid head levels. In additional embodiments the cross-current mixing devices are positioned and/or have structural features which facilitate or otherwise control or enhance liquid flow and momentum along the tray deck and/or minimize liquid from entering the associated orifice and falling to the tray below. Non-limiting examples of preferred cross-current mixing devices 115 are described in U.S. Pat. Nos. 7,540,476, 7,708,258, 8,066,264 and 8,720,870, which are incorporated herein by reference for all purposes. In a preferred embodiment the cross-current mixing section 111 comprises at least one cross-current mixing device 115 as described in U.S. Pat. No. 8,720,870. In other preferred embodiments the cross-current mixing device(s) 115 is commercially available Valve selected from the group consisting of a Sulzer MVG valve, a Sulzer V-grid valve, a Koch-Glitsch Provalve, a standard round valve, and a bubble cap.

Figure 2A:
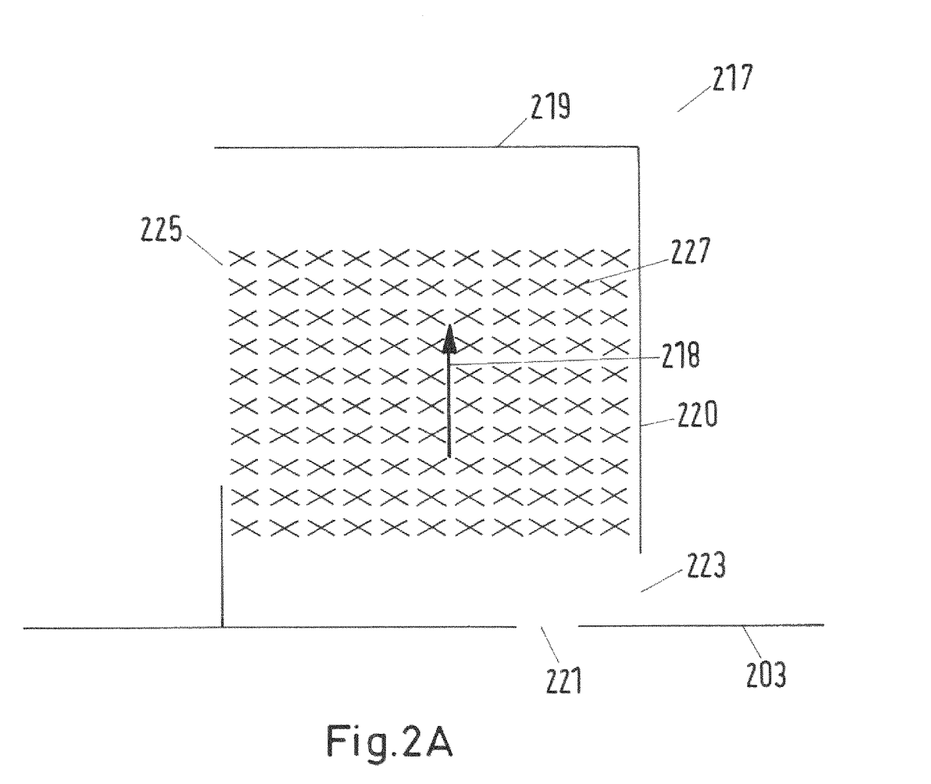
FIGS. 2A-2C are side elevation views of a co-current mixing device in accordance with the present invention.

The co-current vapor-liquid mixing section 113 includes at least one co-current mixing device 117 associated with a second portion of the plurality of orifices in the tray deck. Referring to FIG. 2A, the co-current mixing device 217 includes a conduit 219 wherein liquid possibly having entrained vapor (a.k.a. froth) from the tray deck 203 and vapor from the second portion of orifices travel in co-current path 218 through at least part of the conduit 219. The dimensions and shape of the conduit 219 are not particularly limited (e.g. the conduit can have any particular cross-sectional shape for example rectangular or trapezoidal). In the embodiment shown in FIG. 2A, the conduit is enclosed by an outer wall 220 having a rectangular cross-section (i.e. a packing box) with openings for entry and exit of liquid/froth and vapor. The outer wall 220 of the conduit 219 has a vapor inlet 221 in fluid communication with one or more of the second portion of orifices. As shown in FIG. 2A the conduit 219 is disposed such that the vapor inlet 221 is an orifice in the tray deck 203. The conduit 219 also has a froth inlet 223 in fluid communication with the liquid flow path along the tray deck 203 and a fluid outlet 225.

The term "fluid communication" as used herein with reference to the vapor and froth inlets refer to their positioning with respect to the orifice and the liquid flow path on the tray deck 203. The vapor inlet 221 of the conduit 219 is disposed such that vapor can flow into the conduit 219 from the orifice. The froth inlet 223 of the conduit 219 is disposed such that liquid and liquid/vapor mixture (e.g. froth) can flow into the conduit 219 from the liquid flow path of the tray deck 203. In some embodiments the co-current vapor-liquid mixing section, the co-current vapor-liquid mixing device(s), the froth inlet(s), or any combination thereof, are selected and/or positioned so as to require most, all, or substantially all of the liquid traveling along the liquid flow path to pass through the co-current mixing device(s) in the co-current mixing section.

In preferred embodiments, both liquid and vapor exit the conduit 219 through the fluid outlet 225. However, the conduit may optionally include additional fluid outlet ports to allow exit of liquid and/or vapor. The fluid outlet(s) can be sized to control vapor and liquid velocities exiting the conduit (e.g. larger fluid outlet(s)=less velocity and vice versa).

The conduit 219 contains a packing material 227 disposed in the co-current vapor-liquid flow path 218 of the conduit 219 which is after the vapor and froth inlets 221, 223 and before the fluid outlet 225. The packing material is disposed entirely through a cross-section of the flow path 218 within the conduit such that the vapor and liquid/froth are required to pass through the packing material 227. The packing material 227 increases the interfacial surface area between vapor and liquid within the conduit 219 and provides a region of intimate contact or coalescence between liquid and vapor. Non-limiting examples of packing materials 227 suitable for use in the conduit 219 include: a structured packing such as a corrugated and/or layered metal sheet or sheets (e.g. porous/perforated or non-porous/non-perforated sheet(s)) or woven and/or braided metal fibers; and a non-structured packing such as bundled or packed metal fiber (e.g. for example steel wool) or other durable material randomly packed into the conduit 219.

Figure 2B:
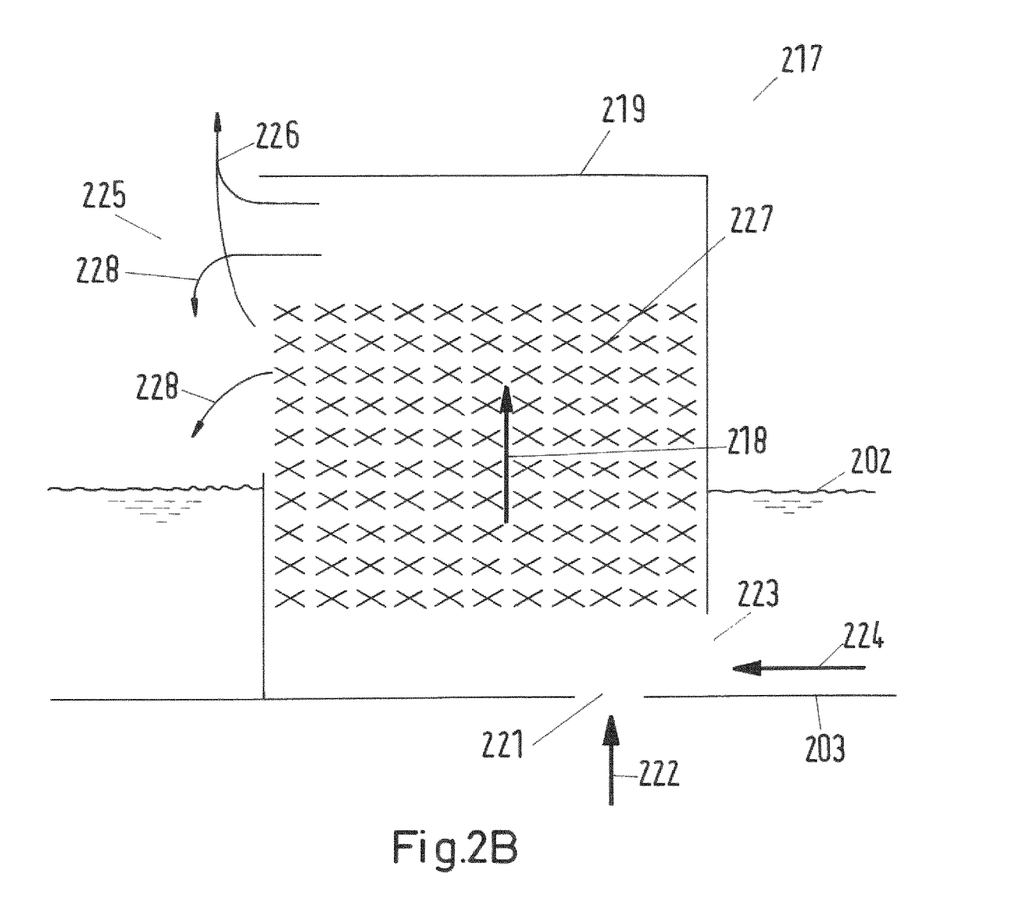

FIG. 2B shows the co-current mixing device 217 in operation in a mass transfer column where liquid and/or froth 202 is present on the tray deck 203 within the co-current mixing section. At least a portion of the liquid/froth 202 flows 224 into the froth inlet 223 of the conduit 219. Vapor flows 222 through the orifice of the tray deck 203/ vapor inlet 221 of the conduit 219 from beneath the tray deck 203. The liquid and vapor mix as they travel in a co-current direction/flow path 218 through packing material 227 disposed within the conduit 219. Liquid and vapor then separate and exit the conduit 219 at the fluid outlet 225. Vapor ascends 226 to the tray above, while liquid returns 228 to the liquid and/or froth 202 on the tray deck 203 and continues along the liquid flow path toward the outlet downcomer section of the tray deck 203. As shown in FIG. 2B, preferably during operation, the liquid/froth 202 level on the tray deck 203 is above the froth inlet 223 and below the fluid outlet 225. Adjusting liquid/froth 202 levels across the tray deck can be accomplished by use of one or a combination of weirs.

The conduit can be associated with one or more, for example two, three, or more, orifices in the tray deck. In a preferred embodiment the conduit is secured (e.g. via bolt, weld, rivet, and/or snap-fit connection, etc.) to the tray deck in a position directly covering the associated orifice(s). In this embodiment, the conduit has an opening or open side disposed toward the orifice(s) to allow vapor from the orifice to enter the conduit or the orifice itself can serve as the vapor inlet of the conduit.

Figure 2C:
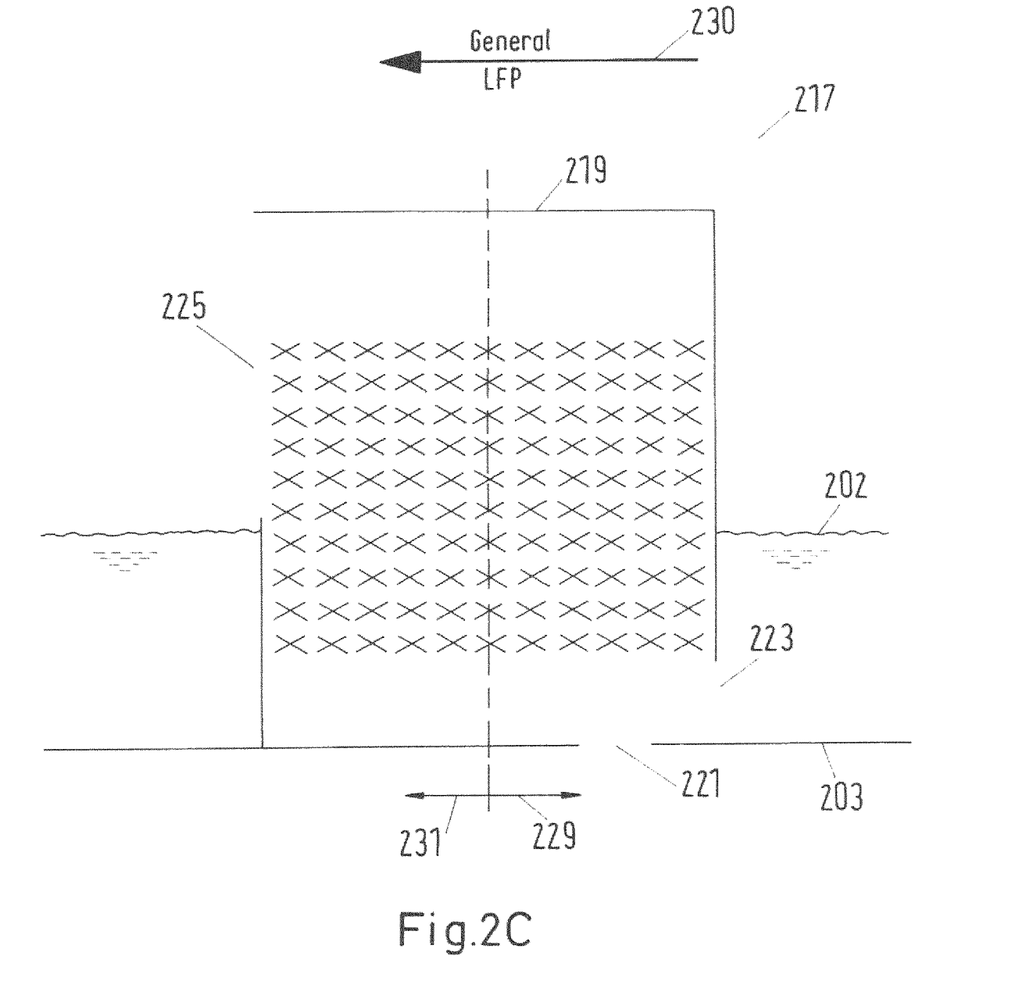

Referring now to the embodiments depicted in FIG. 2C, liquid flows in a liquid flow path 230 along the tray deck 203 within the co-current mixing section. The co-current mixing device 217 is disposed in the liquid flow path 230 such that the conduit 219 has an upstream side 229 and a downstream side 231. In this embodiment, the froth inlet 223 is disposed on the upstream side 229 of the conduit 219 and the fluid outlet 225 is disposed on the downstream side 231 of the conduit 219 and pointing in the direction of the liquid flow path of the tray deck. The present embodiment allows for stepwise movement of liquid/froth 202 along the liquid flow path 230 of the tray deck 203. FIG. 2C shows another embodiment, where the vapor inlet 221 is also disposed on the upstream side 229 of the conduit 219. This embodiment is believed to encourage flow of liquid/froth and vapor into the conduit 219 and efficient mixing through the co-current flow path in the device 217.

Without being bound by a particular mechanism, it is believed that use of the presently described co-current mixing section and co-current mixing device(s) allows for increased interfacial contact surface area between vapor and liquid and therefore increased efficiency of the tray. It is further believed that use of this section and mixing device(s) are effective to reduce the content of froth on the tray deck that enters the conduit through the froth inlet (e.g. reduce froth created by the cross-current mixing devices in the cross-current mixing section) or enters the conduit with the vapor flow from the tray below. In particular, froth which enters the froth and/or vapor inlets is separated in a co-current manner into it component parts, liquid and vapor, which exit the mixing device at the fluid outlet(s).

Figure 3:
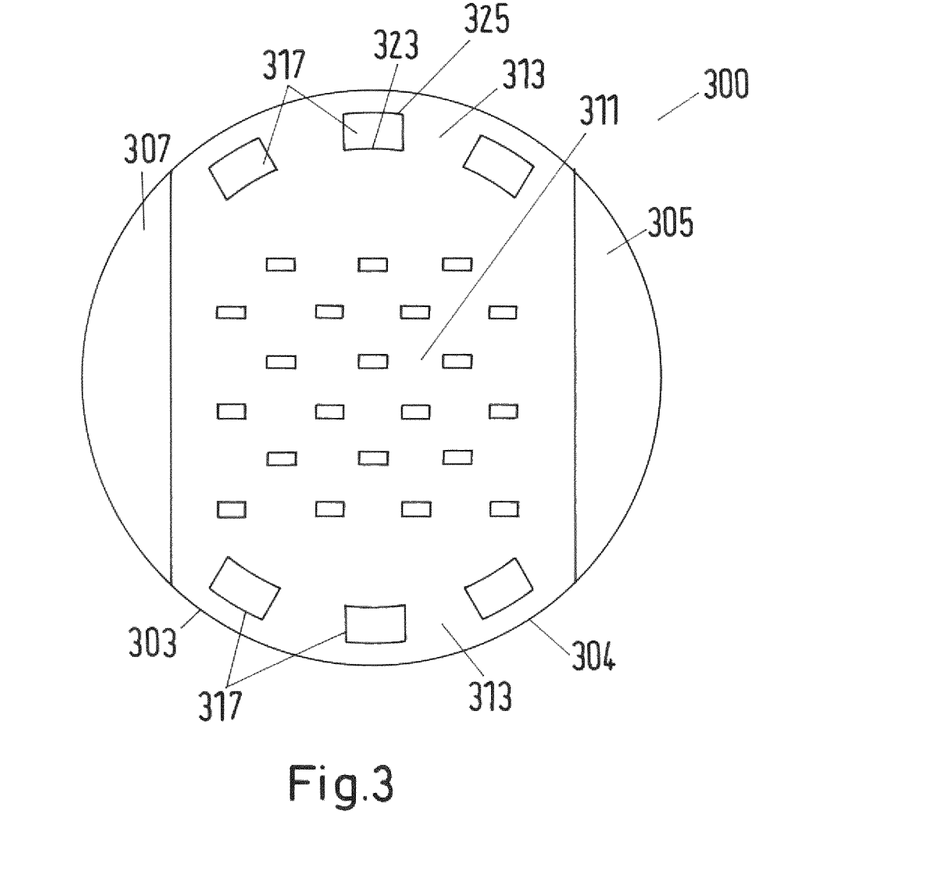
FIG. 3 is a top elevation view of a tray in accordance with the present invention.

Further embodiments of the hybrid contact tray of the present invention are depicted in FIG. 3. Contact tray 300 has a tray deck 303 with a liquid flow path between an inlet downcomer section 305 and an outlet downcomer section 307. The tray deck 303 has a cross-current mixing section 311 and multiple co-current mixing sections 313. Each co-current mixing section 313 has one or more co-current mixing devices 317 associated a portion of orifices in the tray deck 303.

FIG. 3 also shows an embodiment where, one or more of the co-current mixing devices 317 are positioned toward the peripheral edge 304 of the tray deck 303. Furthermore, the froth inlet 323 of the co-current mixing device 317 is disposed toward the interior of the tray deck 303 while the fluid outlet 325 is disposed toward the peripheral edge 304 of the deck 303. Positioning the co-current mixing device(s) 317 according to the present embodiment directs the flow of the fluid outlet 325 toward the column wall. This configuration is believed to allow further separation of liquid from vapor by momentum separation. In other words, liquid droplets entrained in the vapor are directed toward the column wall where they impact, collect, and then travel down the wall to the tray deck 303 while vapor flows upward in the column.

As described above, liquid flows in a liquid flow path along the tray deck. In certain embodiments, for example as shown in FIG. 1, a cross-current mixing section 111 is located upstream along the liquid flow path from a co-current mixing section 113. Furthermore, as shown in FIG. 1, in certain embodiments the co-current mixing section 117 is the final vapor-liquid mixing section in the liquid flow path of the tray deck 103 prior to reaching the final weir 109 separating the downcomer section 107 from the balance of sections along the liquid flow path of the tray deck 103. In this embodiment, shown in FIG. 1, it is believed that employment of a final co-current mixing section 113 and device(s) 117 allow for minimization of froth on the tray deck to provide clear liquid (e.g. minimal entrained vapor) to the outlet downcomer section 107 of the tray deck 103 and thus to the tray below.

As shown in FIG. 1, any or all of sections 105, 111, 113, 107 of the tray deck 105 may be separated from a respective section by one or more weirs 109. Weirs 109 can be used to control liquid momentum along the liquid flow path of the tray deck 103. Weirs 109 can be used to provide regional flow patterns in a respective section (e.g. by use of a weir extending for a portion of the length of the tray deck, or a weirs with holes or other features). Weirs 109 can likewise be used to provide different liquid heights within respective sections of the tray deck 103. In one embodiment, as is disclosed in concurrently filed U.S. Provisional Patent Application Ser. No. 61/753,151 the liquid height (e.g. head level) with respect to the second portion of orifices can be greater than the liquid height with respect to the second portion of orifices. In the present embodiment it is believed that additional head pressure can promote liquid/froth flow into froth inlet of the co-current mixing device.

In the embodiments shown in FIGS. 1 to 3, the trays have a liquid flow path thereon extending from an inlet downcomer section to an outlet downcomer section. In other embodiments still in accordance with the present invention, the tray(s) may have more than one liquid flow path thereon (e.g. the tray(s) may have more than one downcomer inlet section and/or more than one downcomer outlet section). For example, a tray may have two or more inlet downcomer sections disposed toward the outer periphery of the tray for receiving liquid from the tray above, and one or more outlet downcomer sections disposed toward the interior of the tray to provide liquid to the tray below. In another example, a tray may have one or more inlet downcomer sections disposed toward the interior of the tray for receiving liquid from the tray above, and two or more outlet downcomer sections disposed toward the outer periphery of the tray to provide liquid to the tray below. In these examples, each tray has more than one liquid flow path extending between an inlet downcomer section and an outlet downcomer section. At least one, and more preferably all, liquid flow paths on the tray will contain a hybrid configuration of both a cross-current and a co-current mixing section as described herein.

The hybrid contact trays of the present invention are intended for use in mass transfer columns. Hence in a further aspect, the present invention provides a mass transfer column comprising one or more hybrid contact trays according to any herein described embodiment. The tray(s) are arranged horizontally in a spaced apart configuration along the height of the column so that liquid enters the tray at its inlet downcomer section(s) from higher in the column and exits the tray at its outlet downcomer section to a position lower in the column. The hybrid contact tray(s) can be employed in a column optionally in combination with packing materials/sections and/or with other types of trays such as those having only cross-current mixing sections (e.g. sieve trays, valve trays, and/or cap trays, etc.) and/or only co-current mixing sections (e.g. trays having co-current mixing devices such as those herein described). In preferred embodiments the column will have a plurality of horizontally disposed contact trays wherein at least 50%, for example at least 75%, optionally 100%, of the trays include a hybrid tray according to any herein described embodiment.

The hybrid trays of the present invention can be arranged within the column in horizontal groupings of two or more hybrid trays or alternated with different types of trays and/or packing sections along the height of the column. Where the column has more than one hybrid tray according to the present invention (e.g. where several hybrid trays are arranged in a horizontal grouping) the hybrid trays can have different characteristics from one another (e.g. different liquid flow paths and/or directions, different configurations of mixing sections within the liquid flow paths so as to vertically offset the mixing sections and or devices, different amount of orifices disposed in the mixing sections, different packing material in the packed conduits, different weir heights, and different fluid outlet configurations, etc.). For example, where the hybrid contact trays have a single liquid flow path from an inlet downcomer section to an outlet downcomer section, the hybrid trays may be alternated with each other or other types of trays so the outlet downcomer section of one tray provides liquid to the inlet downcomer section of the tray below to provide an overall zig-zag liquid flow pattern down through the column. In a further example where the trays have more than one liquid flow path (e.g. more than one inlet and/or downcomer section) the trays are preferably alternated so as to provide liquid from a tray having one or more outlet downcomer sections disposed toward the interior of the tray to a tray below having an inlet downcomer section disposed toward interior of the tray.

In another embodiment, an existing conventional mass transfer column can be retrofit to include one or more hybrid contact trays according to any embodiment described herein. The decision to retrofit an existing column can be made to increase capacity of the column without having to incur the cost of column design and replacement.

The present invention also provides a method of producing an overhead stream and a bottoms stream from one or more feed streams. Other streams such as side product stream(s) or secondary feed streams can be provide to or removed from the column. The method includes a first step of introducing one or more feed streams to a mass transfer column having a horizontally disposed hybrid contact tray according to any embodiment herein described. A second step includes, treating the one or more feed streams under operating conditions within the column sufficient to create an overhead stream and a bottoms stream.

Operation of mass transfer columns are well known in the art and operating conditions are not particularly limited. In a preferred embodiment, the Inventor's have found the hybrid contact trays described herein are particularly useful in a column operating under elevated pressure (e.g. where the column and/or feed streams are pressurized). The term "elevated pressure" is herein understood to mean operating pressure above normal atmospheric pressure (e.g. a pressure above 1 atm absolute). In some embodiments, the operating pressure is more than 2 atm absolute, more than 5 atm absolute, or more than 10 atm absolute. Without being bound by a particular mechanism, it is believed that columns operating under elevated pressure are more likely to have froth build up and presence on horizontally disposed trays. The hybrid contact trays of the present invention, and in particular use of the co-current mixing sections and devices, are, inter alia, particularly useful for minimization of froth by separation thereof into its components parts. This allows greater efficiency and material throughput of each hybrid contact tray as well as in the column itself. Furthermore, use of the present hybrid trays, and in particular the co-current mixing sections and devices, allow for increased vapor flows through the tray and column without increasing operational costs or reducing efficiencies.

Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner with any other of the various embodiments.

The invention claimed is:

1. A hybrid contact tray for a mass transfer column, the hybrid contact tray comprising:
   a tray deck for passage of liquid along a liquid flow path thereon, the tray deck having a plurality of orifices for passage of ascending vapor through the tray deck;
   a cross-current vapor-liquid mixing section having a first portion of the plurality of orifices; and
   a co-current vapor-liquid mixing section comprising at least one co-current mixing device associated with a second portion of the plurality of orifices,
   wherein the co-current mixing device comprises a conduit having: a vapor inlet in fluid communication with one or more of the second portion of orifices; a froth inlet in fluid communication with the liquid flow path; a fluid outlet; and a packing material disposed within a co-current flow path of vapor and liquid within the conduit disposed after the vapor and froth inlets and before the fluid outlet,
   wherein the liquid flow path along the tray deck is from an inlet downcomer section to an outlet downcomer section, where the cross-current and the co-current vapor-liquid mixing sections are disposed along the liquid flow path between the inlet and outlet downcomer sections, and
   wherein the co-current vapor-liquid mixing section is separated from the outlet downcomer section by a weir.

2. The hybrid contact tray of claim 1, wherein the packing material is selected to increase interfacial surface area between the vapor and liquid in the conduit.

3. The hybrid contact tray according to claim 1, wherein the packing material is selected from the group consisting of: a corrugated metal sheet, woven metal fibers, braided metal fibers, and randomly bundled metal fibers.

4. The hybrid contact tray according to claim 1, wherein the conduit is disposed in the liquid flow path such that the conduit has an upstream side and a downstream side wherein the froth inlet is disposed on the upstream side and the fluid outlet is disposed on the downstream side.

5. The hybrid contact tray according to claim 1, wherein the conduit is disposed in the liquid flow path such that the conduit has an upstream side and a downstream side wherein the vapor inlet is disposed on the upstream side of the conduit.

6. The hybrid contact tray according to claim 1, wherein the conduit is disposed toward a peripheral edge of the tray deck and wherein the fluid outlet of the conduit is pointed toward the peripheral edge of the tray deck.

7. The hybrid contact tray according to claim 1, wherein the conduit is enclosed by an outer wall having a rectangular cross-section and openings for the froth inlet, the vapor inlet, and the fluid outlet.

8. The hybrid contact tray according to claim 1, wherein the conduit is disposed over one or more orifices and wherein the one or more orifices are the vapor inlets.

9. The hybrid contact tray according to claim 1, wherein the cross-current vapor-liquid mixing section and the a co-current vapor-liquid mixing section are positioned relative to the liquid flow path along the tray deck such that the cross-current vapor-liquid mixing section is disposed upstream from the co-current vapor-liquid mixing section.

10. The hybrid contact tray according to claim 1, wherein the cross-current and the co-current vapor-liquid mixing sections are separated from each other by a weir.

11. The hybrid contact tray according to claim 1, wherein the cross-current vapor-liquid section comprises cross-current mixing devices associated with the first portion of the plurality of orifices.

12. The hybrid contact tray according to claim 11, wherein the cross-current mixing devices are orifice caps which are positioned within the liquid flow path at a fixed height with respect to the tray deck or change height with respect to the tray deck.

13. A mass transfer column with a hybrid contact tray comprising:
  a tray deck for passage of liquid along a liquid flow path thereon, the tray deck having a plurality of orifices for passage of ascending vapor through the tray deck;
  a cross-current vapor-liquid mixing section having a first portion of the plurality of orifices; and
  a co-current vapor-liquid mixing section comprising at least one co-current mixing device associated with a second portion of the plurality of orifices,
  wherein the co-current mixing device comprises a conduit having: a vapor inlet in fluid communication with one or more of the second portion of orifices; a froth inlet in fluid communication with the liquid flow path; a fluid outlet; and a packing material disposed within a co-current flow path of vapor and liquid within the conduit disposed after the vapor and froth inlets and before the fluid outlet,
  wherein the liquid flow path along the tray deck is from an inlet downcomer section to an outlet downcomer section, where the cross-current and the co-current vapor-liquid mixing sections are disposed along the liquid flow path between the inlet and outlet downcomer sections, and
  wherein the co-current vapor-liquid mixing section is separated from the outlet downcomer section by a weir.

14. A method of producing an overhead stream and a bottom stream from one or more feed streams, the method comprising the steps of:
(i) introducing one or more feed streams to a mass transfer column with a hybrid contact tray comprising:
  a tray deck for passage of liquid along a liquid flow path thereon, the tray deck having a plurality of orifices for passage of ascending vapor through the tray deck;
  a cross-current vapor-liquid mixing section having a first portion of the plurality of orifices; and
  a co-current vapor-liquid mixing section comprising at least one co-current mixing device associated with a second portion of the plurality of orifices,
  wherein the co-current mixing device comprises a conduit having: a vapor inlet in fluid communication with one or more of the second portion of orifices; a froth inlet in fluid communication with the liquid flow path; a fluid outlet; and a packing material disposed within a co-current flow path of vapor and liquid within the conduit disposed after the vapor and froth inlets and before the fluid outlet,
  wherein the liquid flow path along the tray deck is from an inlet downcomer section to an outlet downcomer secion, where the cross-current and the co-current vapor-liquid mixing sections are disposed along the liquid flow path between the inlet and outlet downcomer sections, and
  wherein the co-current vapor-liquid mixing section is separated from the outlet downcomer section by a wier,
(ii) treating the mass transfer column under operating conditions sufficient to create a tops stream and a bottoms stream,
thereby producing an overhead stream and a bottoms stream from one or more feed streams.

15. The method of claim 14, wherein the operating conditions in step (ii) include an operating pressure above atmospheric pressure.

* * * * *

UNITED STATES PATENT AND TRADEMARK OFFICE
CERTIFICATE OF CORRECTION

PATENT NO.        : 9,999,842 B2
APPLICATION NO.   : 14/760075
DATED             : June 19, 2018
INVENTOR(S)       : Gluer et al.

Page 1 of 1

It is certified that error appears in the above-identified patent and that said Letters Patent is hereby corrected as shown below:

In the Claims

Column 9, Claim 9, Line(s) 21-22 should read -- ...the cross-current vapor-liquid mixing section and the co-current... --

Column 10, Claim 14, Line 41 should read -- ...separated from the outlet downcomer section by a weir,... --

Signed and Sealed this
Twenty-fifth Day of September, 2018

Andrei Iancu
*Director of the United States Patent and Trademark Office*